United States Patent [19]

Iriyama et al.

[11] Patent Number: 5,230,530
[45] Date of Patent: Jul. 27, 1993

[54] AIR BAG MOUNT STRUCTURE FOR VEHICLE

[75] Inventors: Toru Iriyama; Yasunori Iwamoto; Shigeru Kimura; Isao Hirashima, all of Hiroshima; Keiichirou Shibata, Higashihiroshima, all of Japan

[73] Assignee: Mazda Motor Corporation, Hiroshima, Japan

[21] Appl. No.: 774,177

[22] Filed: Oct. 15, 1991

Related U.S. Application Data

[63] Continuation of Ser. No. 460,639, Jan. 3, 1990, abandoned.

[30] Foreign Application Priority Data

| Jan. 9, 1989 | [JP] | Japan | 1-3298 |
| Jan. 23, 1989 | [JP] | Japan | 1-13373 |
| Sep. 19, 1989 | [JP] | Japan | 1-244635 |

[51] Int. Cl.⁵ .................................. B60R 21/16
[52] U.S. Cl. .................................................. 280/732
[58] Field of Search ............... 280/727, 728, 730, 752, 280/732, 743, 779; 180/311, 90; 296/194, 192, 37.1, 37.2

[56] References Cited

U.S. PATENT DOCUMENTS

| 1,838,852 | 12/1931 | Ledwinka | 296/192 |
| 3,774,713 | 11/1973 | Stegmaier | 180/90 |
| 3,817,552 | 6/1974 | Knight, IV et al. | 280/732 |
| 3,930,664 | 1/1976 | Parr et al. | 280/732 |
| 4,153,273 | 5/1979 | Risko | 280/732 |
| 4,191,392 | 3/1980 | Barnett | 280/740 |
| 4,353,588 | 10/1982 | Giugiaro et al. | 296/37.1 |
| 4,355,820 | 10/1982 | Kitagawa et al. | 280/779 |
| 4,362,319 | 12/1982 | Masaki et al. | 280/779 |
| 4,391,465 | 7/1983 | Piano | 296/192 |
| 4,671,536 | 6/1987 | Yoshimura | 280/779 |
| 4,682,788 | 7/1987 | Yoshimura | 280/779 |
| 4,925,209 | 5/1990 | Sakurai | 280/732 |
| 5,074,583 | 12/1991 | Fujita et al. | 280/732 |

FOREIGN PATENT DOCUMENTS

| 2324571 | 11/1973 | Fed. Rep. of Germany . | |
| 58-194663 | 11/1983 | Japan | 280/779 |
| 62-198547 | 9/1987 | Japan . | |
| 63-15257 | 2/1988 | Japan . | |

Primary Examiner—Tamara L. Graysay
Attorney, Agent, or Firm—Keck, Mahin & Cate

[57] ABSTRACT

An air bag mount structure for mounting an air bag unit which is disposed behind an instrument panel for absorbing a shock against a passenger seated in a front seat of a vehicle includes a hinge pillar arranged in a front body structure of the vehicle for supporting a door unit through a hinge device. A support device mounts the air bag unit thereon. The support device is mounted on the hinge pillar at one end portion and on either the hinge pillar or a floor panel at the other end. Stability can be improved in supporting the air bag unit so that a reliability of the air bag system can be obtained in operation.

15 Claims, 11 Drawing Sheets

AIR BAG MOUNT STRUCTURE FOR VEHICLE

This is a continuation of application Ser. No. 07/460,639, filed Jan. 3, 1990 abandoned.

BACKGROUND OF THE INVENTION

1. Field of the Invention

The present invention relates to an air bag unit for an automotive vehicle for protective a passenger in a seat in case of collision of the vehicle, and more particularly to an air bag mount structure for mounting the air bag unit on the vehicle.

2. Description of the Prior Art

Conventionally, there has been known an air bag mount structure as shown in Japanese Utility Model Publication Disclosure No. 63-15257, laid open to the public on Feb. 1, 1988.

According to the air bag mount structure disclosed in the above Japanese application, an air bag unit is carried by a dash upper panel and a glove box mounting bracket extending downwardly from a lower end of the dash upper panel through stays to be placed in a space above the glove box.

Japanese Patent Public disclosure No. 62-198547, laid open to the public on Sep. 2, 1987, discloses a similar air bag mount structure.

U.S. Pat. Nos. 3,774,713 and 4,353,588 disclose shock absorbing member mount structures respectively.

It should however be noted that the conventional air bag mount structure as disclosed in the Japanese Utility Model Public Disclosure No. 63-15257 is disadvantageous in the following point.

The dash upper panel, specifically at rear portion thereof as a structure tends to be readily deformed rearwardly in case of a collision of the vehicle. This makes the mount structure of the air bag unit unstable. Consequently, the air bag unit is not able to protect the passenger effectively as a result that the air bag unit is displaced unduly at the time of collision.

SUMMARY OF THE INVENTION

It is therefore an object of the present invention to provide an air bag mount structure which can provide a stable support for an air bag unit to exert a desirable shock absorbing effect.

It is a further object of the present invention to provide an air bag mount structure which can prevent an air bag unit from moving undesirably in case of a collision of vehicle.

It is still another object of the present invention to provide an air bag mount structure which can be easily removed for inspection and the like.

The above and other objects of the invention can be accomplished by an air bag mount structure for mounting an air bag unit which is disposed behind an instrument panel for absorbing a shock against a passenger seated in a front seat of a vehicle comprising hinge pillar means arranged in a front body structure of the vehicle for supporting a door unit through a hinge device, support means for mounting the air bag unit thereon, the support means being mounted on the hinge pillar means at one end portion and on either the hinge pillar means or a floor panel at the other end.

The support means may be of a pipe like configuration.

The support means extends in a transverse direction of the vehicle and may be connected with a hinge pillar through brackets at opposite ends. The hinge pillar is provided for supporting a door unit through a hinge device. The support means may be supported at an intermediate portion by a reinforcement structure which is mounted on a tunnel structure formed on a floor panel.

Preferably, a knee protector is carried by the support means through a U-shaped bracket at end portions thereof.

The air bag unit may be disposed in a space defined by an instrument panel and above a hypothetical locus of the knee protector in case of collision. The air bag unit and the knee protector are arranged side by side in the up and down direction.

The air bag mount structure is preferably further provided with mount case means for receiving the air bag unit therein. The case means is secured to the support means at a lower portion of the bottom thereof. In this case, the air bag unit is positioned slightly upwardly so that an air bag is oriented to be inflated toward the upper portion of the passenger.

An auxiliary support member of a pipe like configuration may be disposed downward and in parallel with the support means. The auxiliary member may be supported by the hinge pillar at one end and by an extension formed on the reinforcement structure at the other end. For carrying the air bag unit, the case means may be joined with the support means at an upper portion of the external bottom surface and with the auxiliary member at a lower portion of a lower surface of the mount case means.

The support means may be constituted by a plurality of members for supporting the external upper portion of the bottom of the mount case means.

The auxiliary member may be constituted by a plurality of members for supporting an external lower portion of the mount case means.

The support means and the auxiliary member are not necessarily connected with the hinge pillars at both ends. One end thereof may be supported by the reinforcement structure fixed to the tunnel structure of the floor panel.

The air bag mount structure may be further provided with a pair of brackets welded onto the support means in a transversely spaced relationship with each other for mounting the air bag unit thereon. The bracket may be provided with an engaging surface on which the mount case means is mounted.

In further embodiment, the air bag mount structure is provided with a lower bracket with a round flange which is connected with the support means and an upper bracket with a flat flange for mounting the air bag unit.

Furthermore, the air bag mount structure may be provided with a substantially U-shaped bracket extending transversely. The bracket is connected with the front body structure at a front end and with an upper portion of the mount case means at a rear end. The bracket may be provided with libs for reinforcing corner portions of the bracket. The front end portion of the bracket may extend upwardly and thereafter forwardly to form a substantially horizontal flange by which the bracket is connected with the front body structure. The bracket may be provided with an extension at the rear end portion which terminates in an upper surface of the mount case means to be engaged with the mount case means. This structure further improves the rigidity of the air bag mount structure.

The above and other features of the present invention will be apparent from the following description taking reference to the accompanying drawings.

DESCRIPTION OF THE PREFERRED EMBODIMENTS

Figure 1:
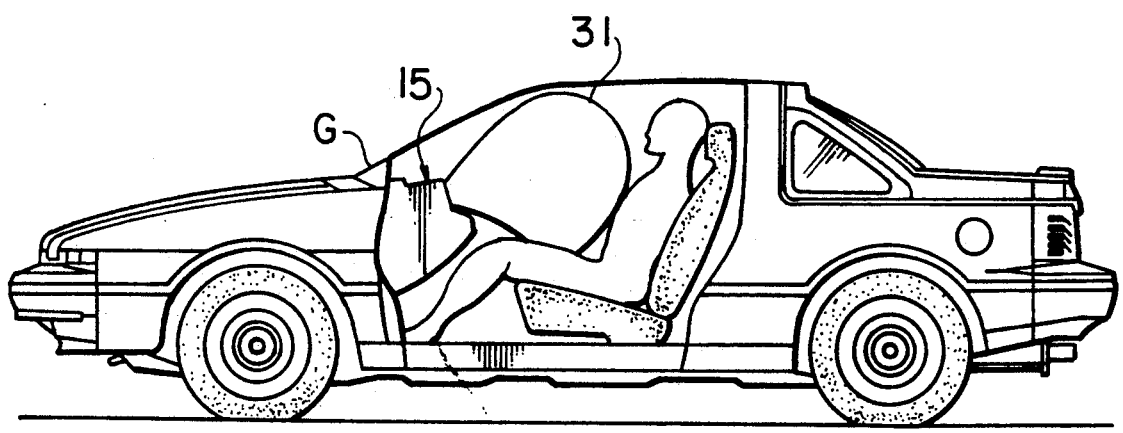
FIG. 1 is a partially sectional view showing inside of a passenger compartment of a vehicle to which the present invention can be applied.
Figure 2:
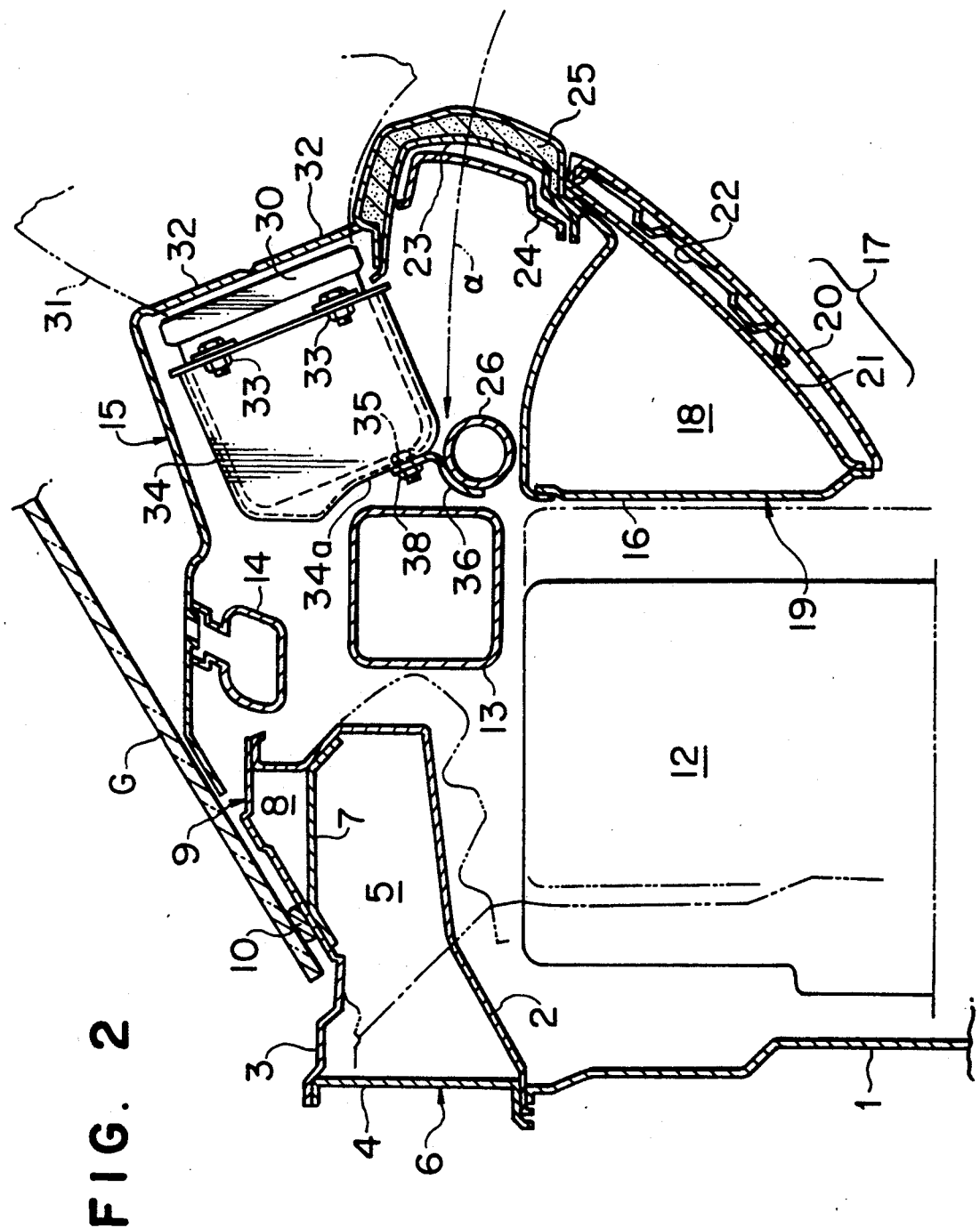
FIG. 2 is a sectional view showing a front body structure of the vehicle to which an air bag mount structure in accordance with present invention is incorporated.
Figure 3:
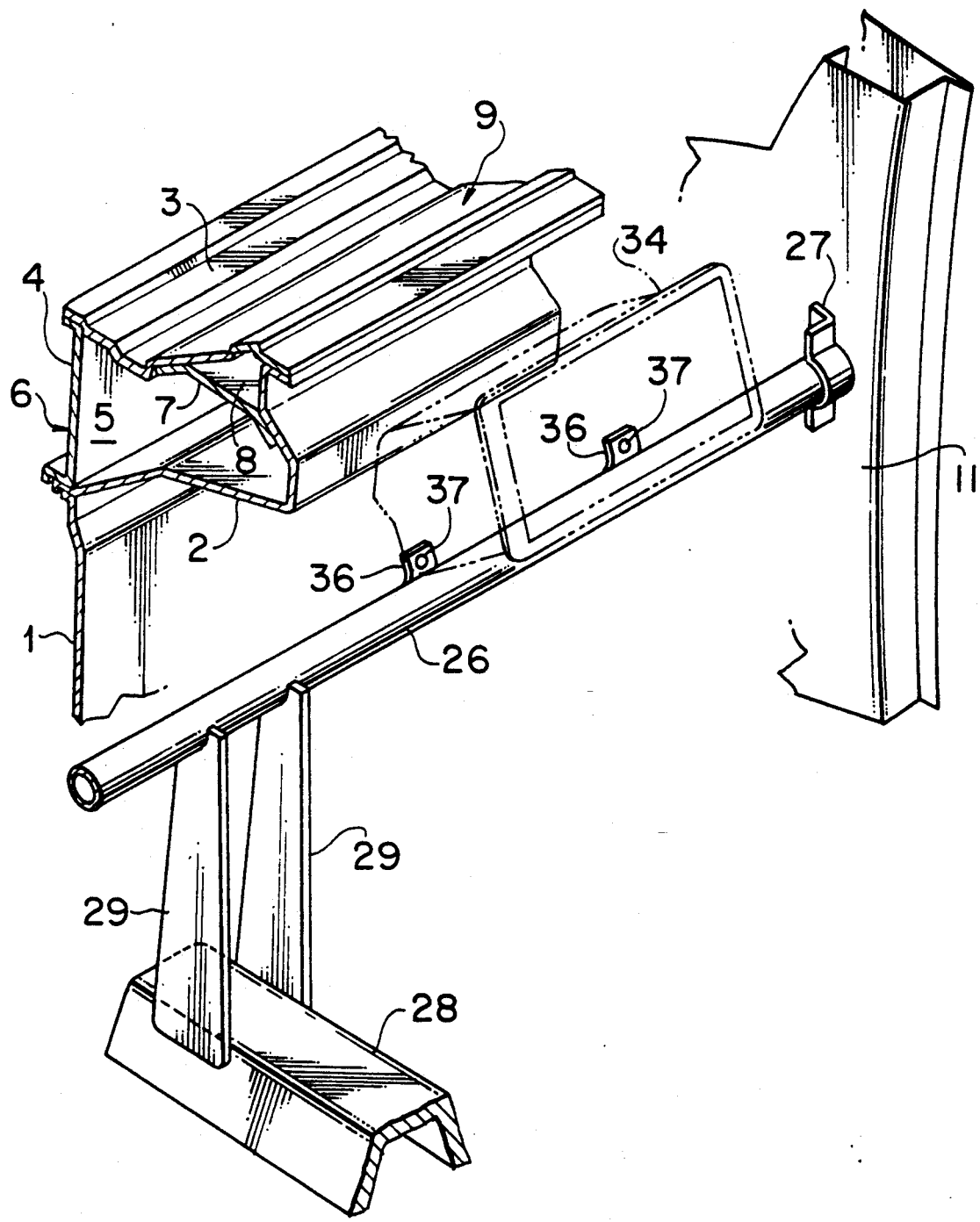
FIG. 3 is a perspective view of an air bag mount structure in accordance with a preferred embodiment of the present invention.

Referring to the drawings, specifically to FIGS. 1 through 3, there is shown an air bag mount structure in accordance with a preferred embodiment of the present invention. As shown in FIG. 2, a front body structure of a vehicle is provided with a dash lower panel 1 arranged at a rear end portion of an engine room, a dash upper panel 2 connected with an upper end of the dash lower panel 1, a cowl upper panel 3 connected with an upper end of the dash upper panel 2 at a rear end, and a cowl front panel 4 connected with a front and lower end of the cowl upper panel 3 and a front and upper end of the dash upper panel 2 to thereby define a closed cross sectioned space 5 of a cowl box 6.

A reinforcement 7 extending horizontally and transversely in the vehicle is disposed between the cowl upper panel 3 and the dash upper panel 2 and connected thereto for forming a windshield glass support structure 9 having a closed cross sectioned space 8 defined by the three elements 2, 3 and 7. A front windshield glass G is carried by the support structure 9 formed on the cowl upper panel 3 in terms of an adhesive 10.

A cooling unit 12 is disposed rearward of the dash lower panel 1 and downward of the dash upper panel 2. A bent duct 13 is disposed near a rear and upper end portion of the cooling unit 12 for directing an air flow from the cooling unit 12 toward a driver and an assistant passenger through a bent door device. A demister duct 14 is mounted on a lower surface of a top deck of an instrument panel 15 for introducing the air flow from the cooling unit 12 toward the windshield glass for demisting.

Rearward of the cooling unit 12 are disposed a glove box 19 having a glove tray 16, a glove lid 17 and a glove pocket 18. The glove lid 17 is provided with a glove lid outer panel 20 and glove lid inner panel 21. A first knee protector 22 is mounted on an inner surface of the glove lid outer panel 20. An instrument panel core 23 is disposed above the glove lid 17. An arcuate second knee protector 24 is arranged behind the instrument panel core 23. A trim member 25 is arranged on the instrument panel core 23.

The second knee protector 24 is carried by a steering support member 26 of a pipe like configuration thereof a U-shaped bracket (not shown) at end portions thereof.

The steering support member 26 extends in a transverse direction of the vehicle and is connected with a hinge pillar 11 through brackets 27, 27 at opposite ends. The hinge pillar 11 is provided for supporting a door unit through a hinge device. The steering support member 26 is supported at an intermediate portion by a pair of reinforcements 29, 29 which is mounted on a tunnel structure 28 formed on a floor panel.

An air bag unit 30 is disposed in a space defined by the instrument panel 15 and above a hypothetical locus α of the knee protector 24 in case of collision. Thus, the air bag unit 30 and the knee protector 24 are arranged side by side in the up and down direction.

The air bag unit 30 is provided with an igniter for firing an explosive in an inflator to produce a gas when a collision is detected through a collision sensor, an air bag 31 receiving the gas from the inflator to be inflated as shown in FIG. 1, opening unit covers 32, 32 which are disposed behind the instrument panel 15 in parallel therewith. Thus, the inflated air bag 31 receives an upper portion of the passenger to lighten a collision shock.

The air bag unit 30 is received and mounted to a mount case 34 through a bolt and nut device 33. As shown in FIG. 3, the mount case 34 is of a box like configuration of a rectangular cross section. A plurality of stud bolts 35 are provided on an external surface of a bottom of the case 34a in the transverse direction of the vehicle.

A plurality of bracket 36 corresponding to the stud bolts 35 are mounted on the steering support member 26. Each of the brackets 36 is provided with an opening 37 through which the bracket 36 is engaged with the stud bolt 35 by means of a nut 38.

Thus, the case 34 is secured to the steering support member 26 at a lower portion of the bottom thereof. In this case, the air bag unit 30 is positioned slightly upwardly so that the air bag 31 is arranged to be inflated toward the upper portion of the passenger.

In operation, within about 20 m seconds from a detection of a collision, the inflator is actuated to cause the gas to be introduced into the air bag 31. The air bag 31 is inflated to open the unit covers 32, 32 and reaches a full developed condition as shown in FIG. 1 within approximately 50 m second from the collision detection.

On the other hand, the dash lower panel 1 and a lower portion of the dash upper panel 2 are forced to be moved rearwardly as shown in FIG. 2 by phantom line relative to the passenger and the knee protector 22 within approximately 40 m seconds. Then, the knee of the passenger is brought into contact with the knee protector 22 within approximately 50 m seconds from the collision.

It will be understood that the steering support member 26 is less influenced by the deformation of the lower and upper dash panels 1 and 2 at the time of collision. This is partly because the steering support member 26 is mounted on the hinge pillar 11 and supported by the floor panel. The hinge pillar 11 is hardly influenced by a deformation of a front end portion of the vehicle by collision. In addition, the steering support member 26 is not directly engaged with the dash panel 1 and 2 and the cowl panels 3 and 4 which defines the cowl box 6. Therefore, the air bag unit 30 can be maintained at the original position as stable as possible in case of collision. Consequently, a desirable shock absorbing effect in terms of the air bag unit 30 can be obtained since the air bag unit 30 is mounted on the steering support member 26. The air bag 31 is withered afterwards.

Figure 4:
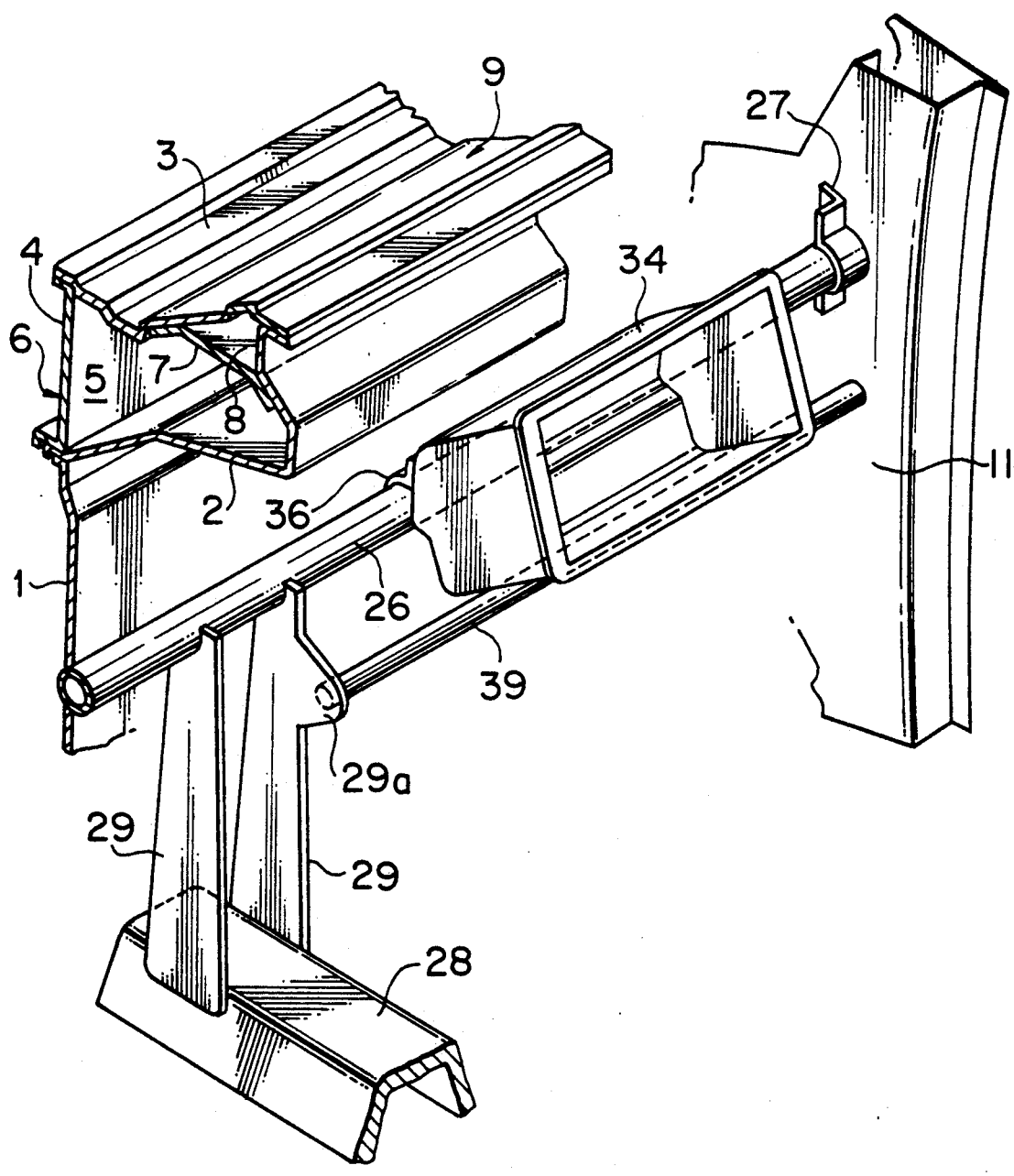
FIG. 4 is a perspective view similar to FIG. 3 but showing another embodiment.

Referring to FIG. 4, there is shown another embodiment of the present invention.

Figure 5:
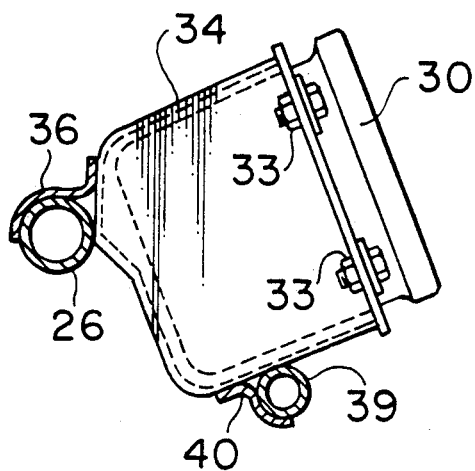
FIG. 5 is a sectional view of the air bag mount structure of FIG. 4.

In the illustrated embodiment, an auxiliary support member 39 of a pipe like configuration is disposed downward and in parallel with the steering support member 26. The support member 39 is supported by the hinge pillar 11 at one end and by an extension 29a formed on the reinforcement 29 at the other end. As shown in FIG. 4 and FIG. 5, the case 34 for the air bag unit 30 is joined with the steering support member 26 at an upper portion of the external bottom surface through the brackets 36 and with the auxiliary support member 39 at a lower portion of a lower surface of the case 34 through brackets 40. Thus, the case 34 or the air bag unit 30 is carried by a plurality of the support members 26 and 30, so that a stability of the mount structure for the air bag unit 30 can be improved.

Figure 6:
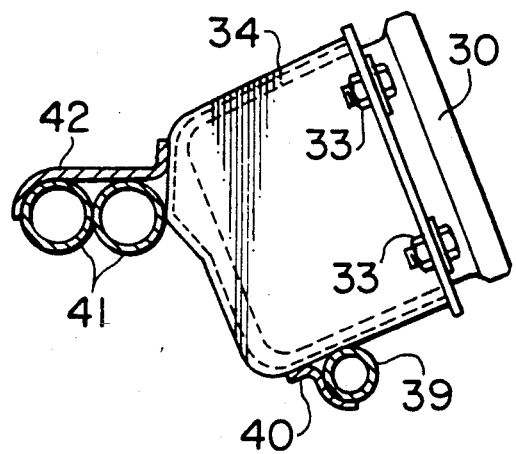
FIG. 6 is a sectional view of an air bag mount structure similar to FIG. 5 but showing another modification.

Referring to FIG. 6, there is shown in still another embodiment of the present invention.

A pair of main support members 41, 41 are provided instead of the steering support member 26 for supporting the upper portion of the external bottom surface of the case 34 through brackets 42.

Figure 7:
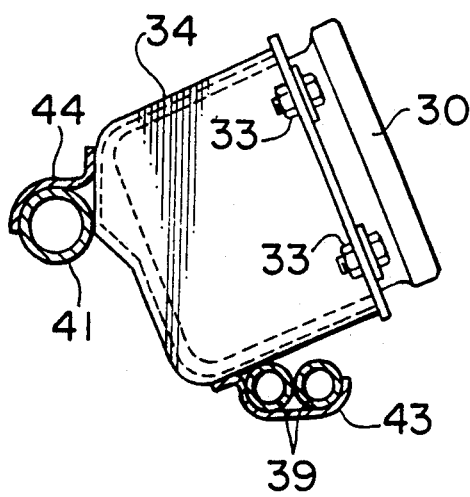
FIG. 7 is a sectional view similar to FIG. 6 but showing further modification.

In another modification of the present invention shown in FIG. 7, a pair of auxiliary support members 39, 39 are employed for supporting the lower portion of the external lower surface of the case 34 through brackets 43 instead of the single auxiliary support member as shown in FIG. 6. Additionally, a single main support member 41 is provided for supporting the upper portion of the external bottom surface of the case 34 through brackets 44.

Figure 8:
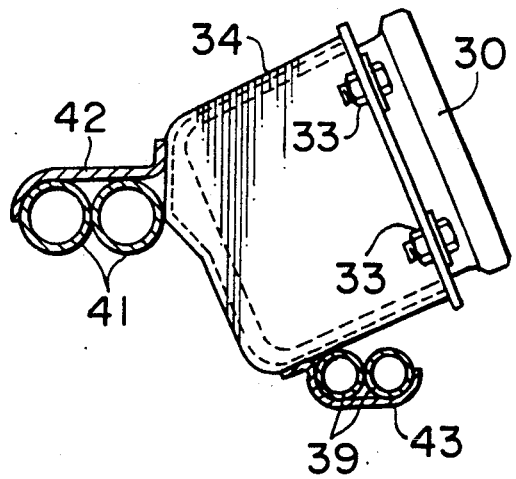
FIG. 8 is a sectional view similar to FIG. 7 but showing still further modification.
Figure 9:
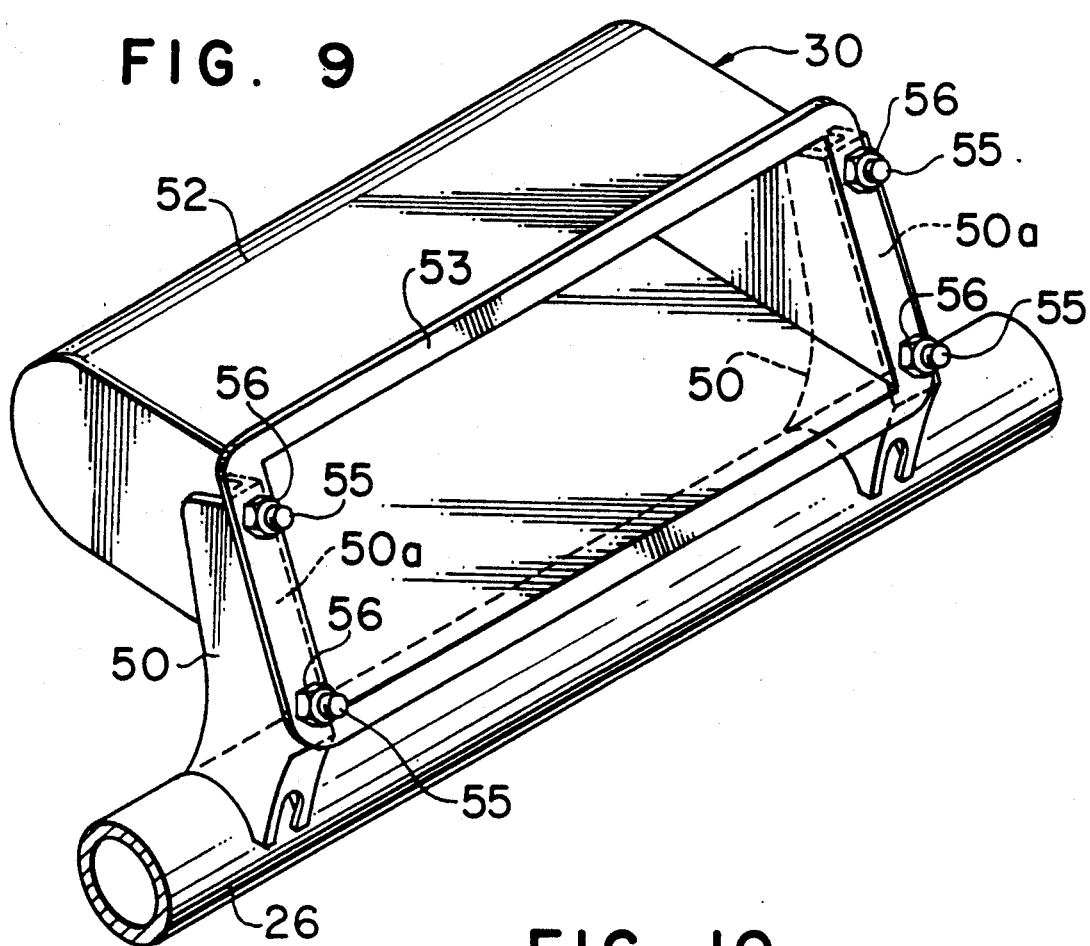
FIG. 9 is a perspective view showing an air bag mount structure of a still another embodiment of the present invention.
Figure 10:
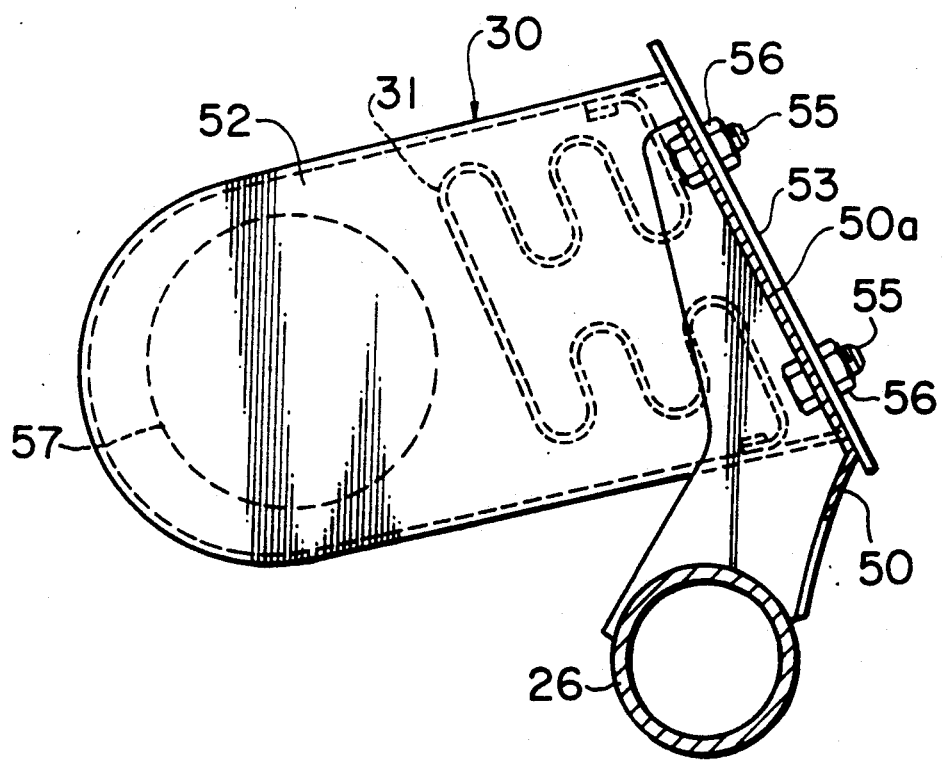
FIG. 10 is a side view of the air bag mount structure of FIG. 9.
Figure 11:
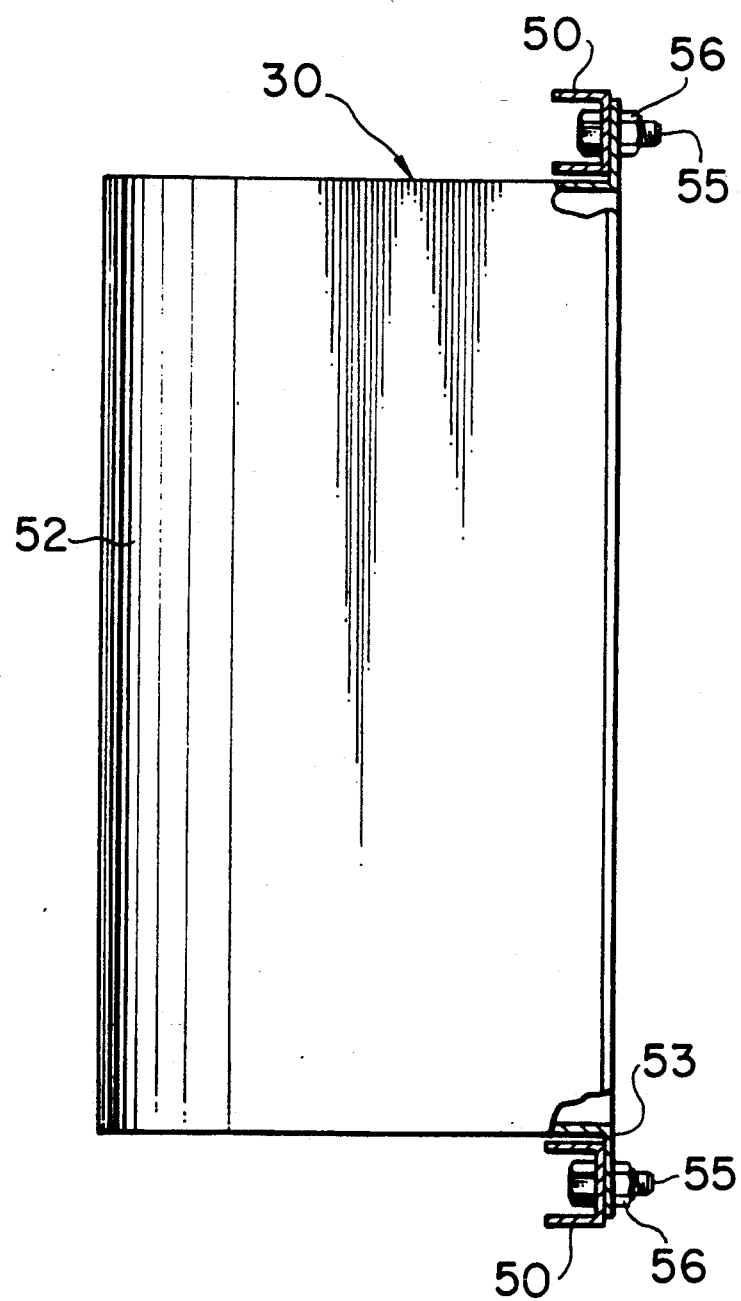
FIG. 11 is a plan view of the air bag mount structure of FIG. 9.
Figure 12:
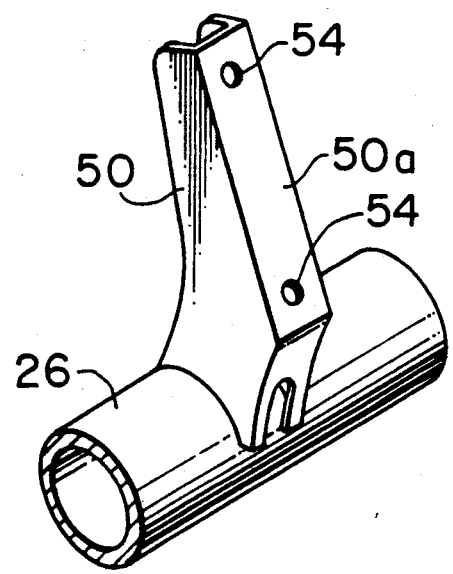
FIG. 12 is a perspective view of a bracket employed in the embodiment of FIG. 9.

The case 34 may be carried by the pair of the main support members 41, 41 and the pair of the auxiliary support members 39, 39 as shown in FIG. 8.

The steering support member 26 and the main support members 41, 41 are not necessarily connected with the hinge pillars 11 at both ends. One end of the members 26, 41 may be supported by the reinforcement 29 fixed to the tunnel structure of the floor panel 28. End portion of the auxiliary support member 39 may be connected to any of the floor panel 28, hinge pillar and reinforcement 29.

Referring to FIGS. 9-12, there is shown a further embodiment of the present invention.

A pair of a channel section brackets 50, 50 are welded onto the steering support member 26 in a transversely spaced relationship with each other. The bracket 50 is provided with an engaging surface 50a on which a case 52 for an air bag unit 30 is mounted through an annular flange 53 thereof. In mounting the case on the bracket, the case 52 is set on the brackets 50.; Bolts 55, 55 are inserted into holes 54 on the engaging surface 50a and fixed by nuts 56, 56 together with the flange 53 to the brackets 50, 50.

The air bag unit 30 is provided with the air bag 31, inflator 57.

Figure 13:
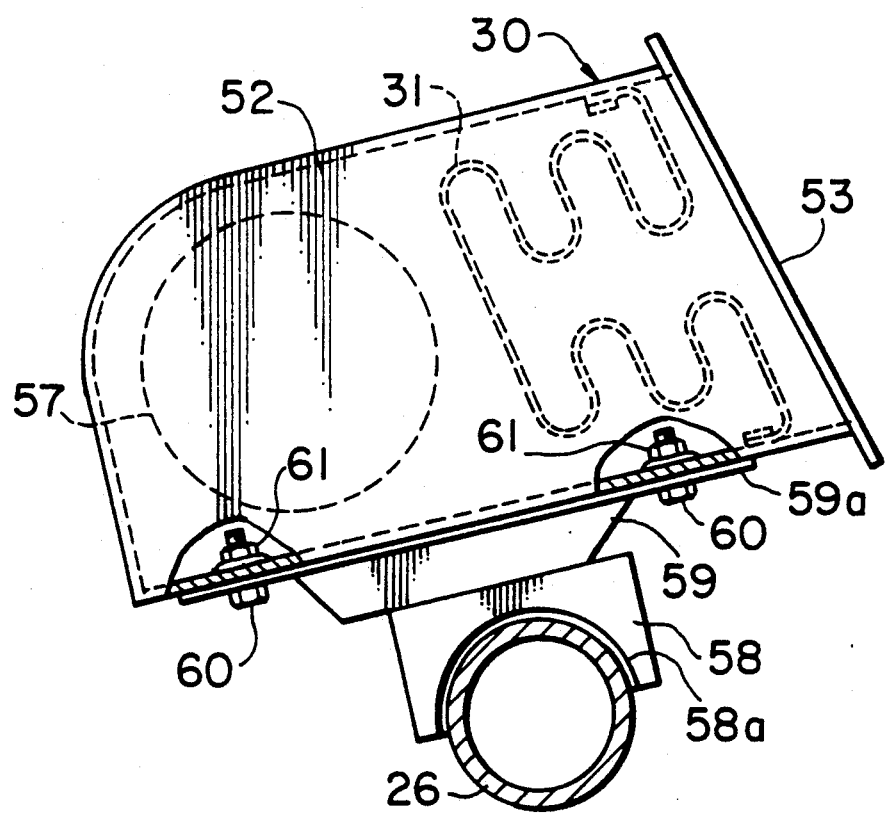
FIGS. 13 is a side view of a further embodiment of an air bag mount structure of the present invention.

Referring to FIG. 13, there is shown a still another embodiment of the present invention.

The illustrated air bag mount structure is provided with a lower bracket 58 with a round flange 58a and an upper bracket 59 with a flat flange 59a for mounting the air bag unit 30 thereon. The lower and upper brackets 58 and 59 are engaged with each other. The round flange 58 is of a complementary configuration against an external surface of the steering support member 26. The bracket 58 is fixed to the steering support member 26 at the flange 58a by welding. The case 52 is secured to the flange 59a of the upper bracket 59 through bolts 60 and nuts 61.

The case 52 with the air bag unit 30 can be easily removed by disengaging the bolts 60 and nuts 61 through the glove box for inspection of maintenance service.

Figure 14:
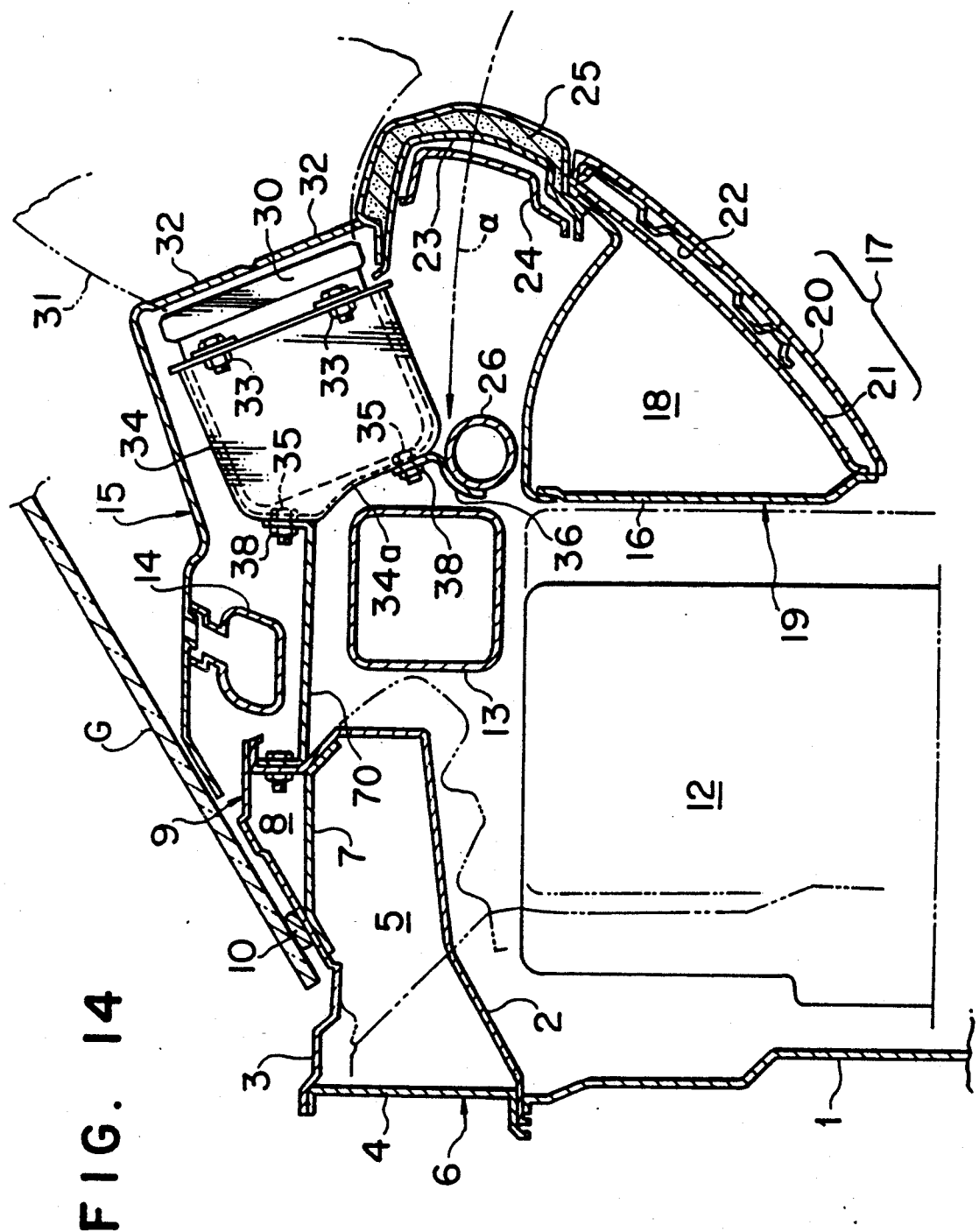
FIG. 14 is a sectional view showing a front body portion into which an air bag mount structure in accordance with yet further embodiment is incorporated.
Figure 15:
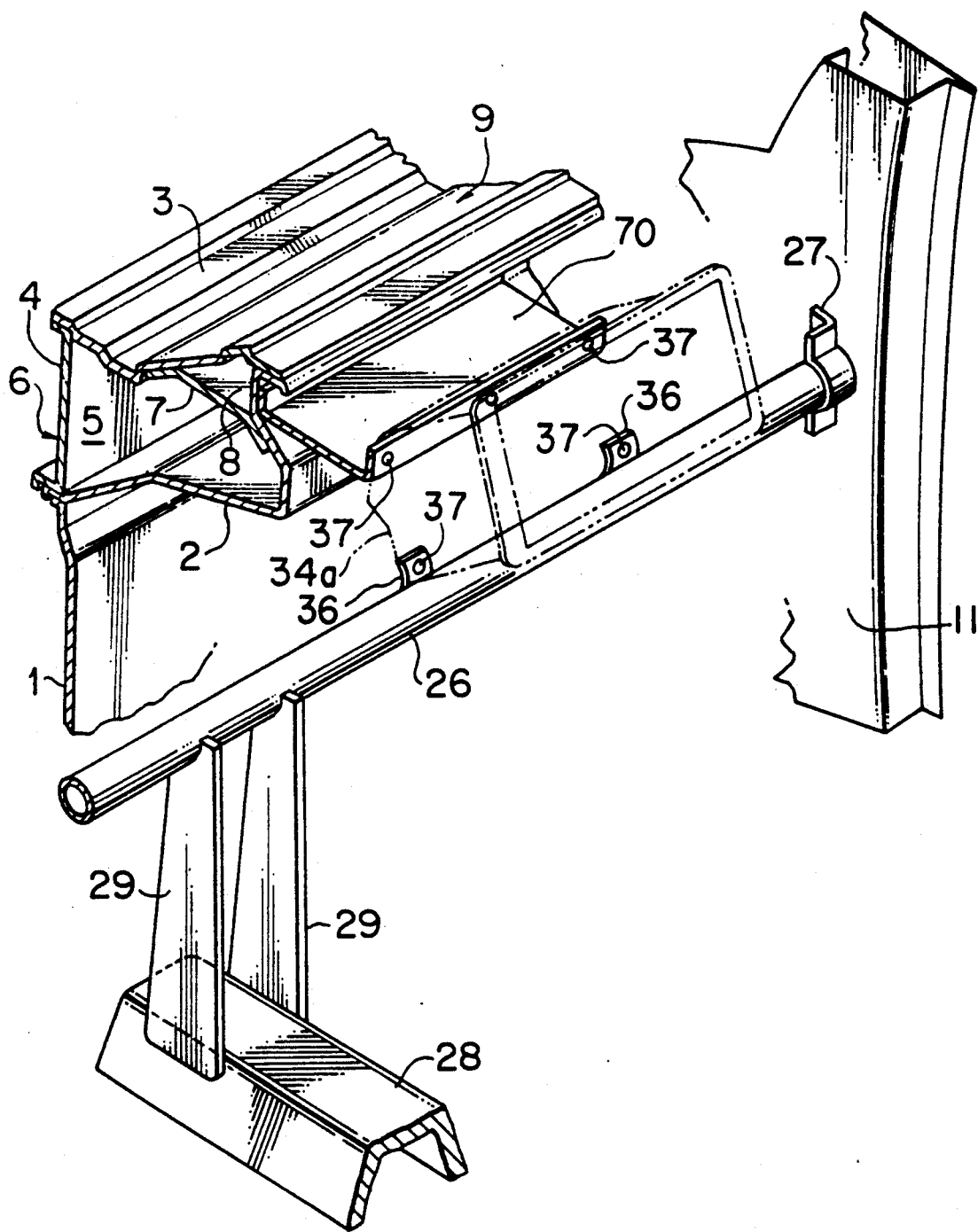
FIG. 15 is a perspective view of the air bag mount structure of FIG. 14.

Referring to FIGS. 14 and 15, there is shown a still further embodiment of the present invention. The air bag mount structure is provided with a U-shaped bracket 70 extending transversely. The bracket 70 is connected with an upper end portion of the upper dash panel 2 through a bolt and nut device by holes (not indicated) in a front flange portion thereof at a front end and with an upper portion of the external surface of the bottom of the case 34 at a rear end through the bolt 35 and nut device 38 by holes 37 in a range flange portion. According to the structure of the illustrated embodiment, the case 34 is carried by the cowl box structure through the bracket 70 in addition to the steering support member 26 to improve a rigidity of the air bag mount structure in supporting the air bag unit 30.

Figure 16:
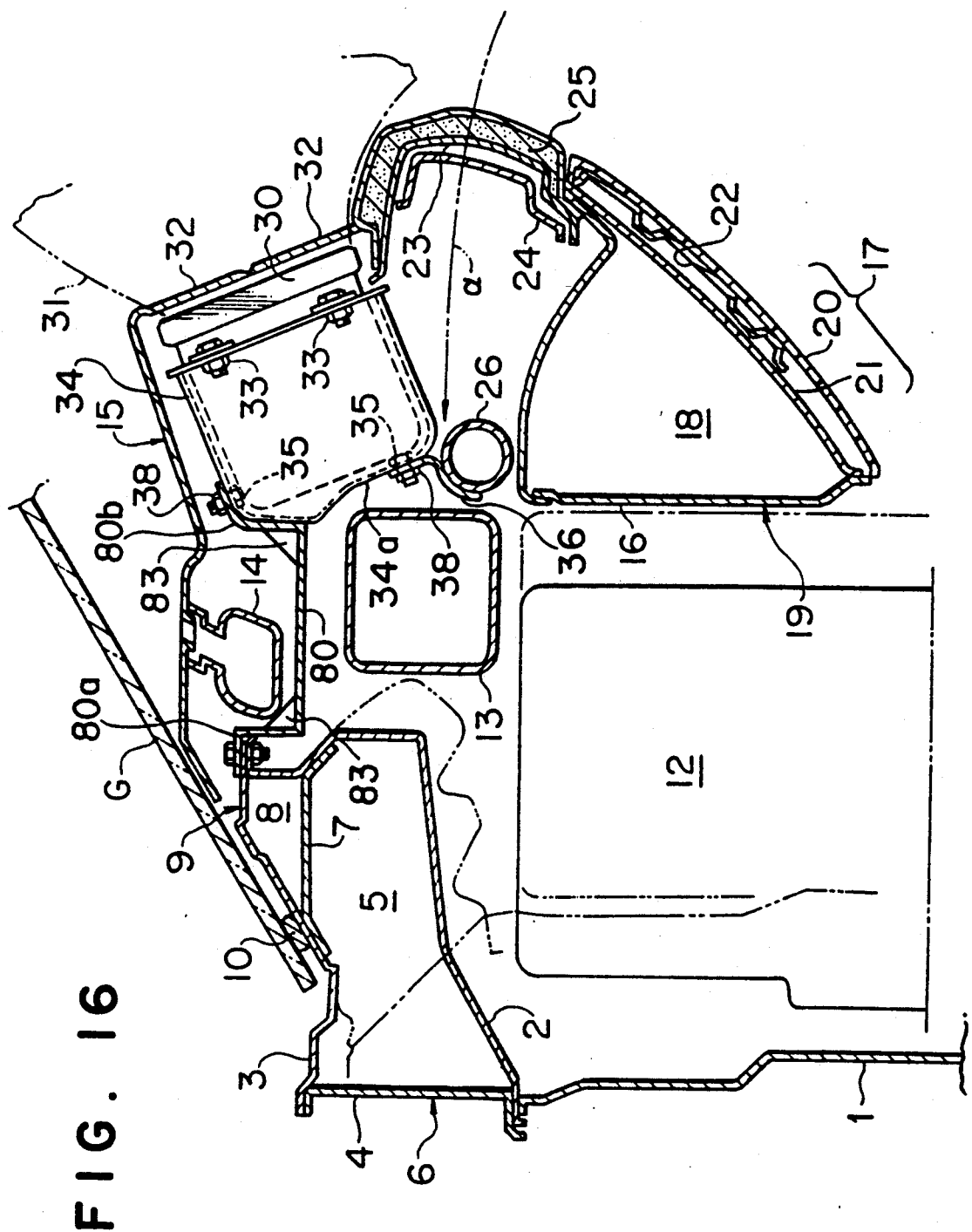
FIG. 16 is a sectional view similar to FIG. 14 but showing further modification.

Referring to FIG. 16, a modification of the embodiment of FIGS. 14 and 15 is shown. In this embodiment, the bracket 80 is provided with ribs 83, 83 for reinforcing corner portions of the bracket 80. The front end of the bracket 80 extends upwardly and thereafter forwardly to form a substantially horizontal flange 80a by which the bracket is connected with the rear end of the upper cowl plane 3 together with the upper end of the dash upper panel 2. The bracket 80 is provided with an extension 80b at the rear end portion which terminates in an upper surface of the case 34 and is brought into contact with an external surface of the upper surface of the case 34. The bracket 80 is secured to the case 34 through the bolt 35 and nut device 38 which connects the rear end portion of the bracket 80 to the case 34 through the extension 80b. This structure further improves the rigidity of the air bag mount structure.

It will be apparent that various modifications and improvements may be made based on the above description by those skilled in the art without departing from the scope of the claims as attached.

We claim:

1. An air bag mount structure for a vehicle having a front body structure including at least one dash panel and at least one cowl panel for partitioning a passenger compartment from an engine room, the air bag mount structure supporting an air bag unit having an air bag for absorbing a shock against a passenger comprising:
   a pair of hinge pillars, each of said hinge pillars arranged in the front body structure of the vehicle and supporting a door unit through a hinge device,
   support means for supporting said air bag unit extending in a transverse direction of the vehicle and connected with both of the hinge pillars at opposite ends, and
   at least one mounting bracket for mounting the air bag unit on the support means, the mounting bracket connecting the air bag unit only to the support means, the support means being not directly connected to any of the dash and cowl panels so that rearward deformation of the dash and cowl panels during a collision is not transmitted to the air bag unit directly.

2. An air bag mount structure as recited in claim 1 wherein the support means is of a pipe like configuration extending transversely of the vehicle.

3. An air bag mount structure as recited in claim 1 wherein a knee protector is downwardly disposed adjacent to the support means.

4. An air bag mount structure as recited in claim 3, and further comprising an instrument panel facing said passenger compartment, wherein the air bag unit is disposed in a space defined by the instrument panel and above a hypothetical locus of the knee protector in case of collision.

5. An air bag mount structure as recited in claim 1, and further comprising an auxiliary support member extending transversely of the vehicle and parallel to the support means below the support means so as to support a mount case means for receiving the air bag unit therein.

6. An air bag mount structure as recited in claim 5, and further comprising a floor panel and a reinforcement structure on said floor panel, wherein the auxiliary support member is supported by one of the hinge pillars at one end and by an extension formed on the reinforcement structure at its other end.

7. An air bag mount structure as recited in claim 1 further comprising a pair of brackets welded onto the support means in a transversely spaced relationship with each other for mounting the air bag unit thereon.

8. An air bag mount structure as recited in claim 7, wherein each bracket is provided with an engaging surface on which a mount case means for receiving said air bag unit is mounted.

9. An air bag mount structure as recited in claim 1 further comprising a lower bracket with a round flange which is connected with the support means and an upper bracket with a flat flange for mounting the air bag unit, the lower and upper brackets being engaged with each other.

10. An air bag mount structure as recited in claim 1, and further comprising a substantially U-shaped bracket extending transversely of the vehicle and connected with the front body structure at a front end and with an upper portion of a mount case means for receiving said air bag unit at a rear end.

11. An air bag mount structure as recited in claim 10, wherein the bracket comprises ribs for reinforcing corner portions of the bracket.

12. An air bag mount structure for mounting an air bag unit, disposed behind an instrument panel for absorbing a shock against a passenger seated in a front seat of a vehicle, comprising:
   a hinge pillar means arranged in a front body structure of the vehicle for supporting a plurality of door units through hinge devices,
   support means for mounting the air bag unit thereon, the support means being mounted on the hinge pillar means at opposite ends,
   mount case means for receiving the air bag unit therein,
   the mount means being secured to the support means at a lower portion so that the air bag unit is positioned slightly upwardly for causing an air bag to be inflated toward an upper portion of the passenger, and
   an auxiliary support member extending transversely in parallel with the support means at a position below the support means so as to support the mount case means,
   the auxiliary support member being supported by the hinge pillar means at one end and by an extension formed on reinforcement structure on a floor panel at the other end,
   the mount case means being joined with the support means at an upper portion of an external bottom surface thereof and with the auxiliary support member at a lower portion of a lower surface thereof.

13. An air bag mount structure for mounting an air bag unit, disposed behind an instrument panel for absorbing a shock against a passenger seated in a front seat of a vehicle, comprising:
   hinge pillar means arranged in a front body structure of the vehicle for supporting a plurality of door units through hinge devices,
   support means for mounting the air bag unit thereon, the support means being mounted on the hinge pillar means at opposite ends,
   mount case means for receiving the air bag unit therein, the mount case means being secured to the support means at a lower portion so that the air bag unit si positioned slightly upwardly for causing an air bag to be inflated toward an upper portion of the passenger, and
   an auxiliary support member extending transversely in parallel with the support means at a position below the support means so as to support the mount case means,
   the auxiliary support member being supported by the hinge pillar means at one end and by an extension formed on reinforcement structure on a floor panel at the other end, wherein the support means comprises a plurality of members for supporting an external upper portion of the mount case means, and the auxiliary support member comprises a plurality of members for supporting an external lower portion of the mount case means.

14. An air bag mount structure for mounting an air bag unit, disposed behind an instrument panel for absorbing a shock against a passenger seated in a front seat of a vehicle, comprising:
   hinge pillar means arranged in a front body structure of the vehicles for supporting a plurality of door units through hinge devices, support means for mounting the air bag unit thereon, the support means being mounted on the hinge pillar means at opposite ends, and a substantially U-shaped bracket extending transversely of said vehicle and connected with the front body structure at a front end and with an upper portion of mount case means at a rear end, wherein a front end portion of the bracket extends upwardly and thereafter forwardly to form a substantially horizontal flange by which the bracket is connected with the front body structure.

15. An air bag mount structure for mounting an air bag unit, disposed behind an instrument panel for absorbing a shock against a passenger seated in a front seat of a vehicle, comprising:

hinge pillar means arranged in a front body structure of the vehicle for supporting a plurality of door units through hinge devices, support means for mounting the air bag unit thereon, the support means being mounted on the hinge pillar means at opposite ends, and a substantially U-shaped bracket extending transversely of said vehicle and connected with the front body structure at a front end and with an upper portion of mount case means at a rear end, wherein the bracket is formed with an extension at a rear end portion thereof which terminates in an upper surface of a case means for receiving the air bag unit therein to be engaged with the mount case means.

* * * * *